United States Patent [19]
Pond et al.

[11] Patent Number: 5,886,690
[45] Date of Patent: Mar. 23, 1999

[54] PROGRAM SCHEDULE USER INTERFACE

[75] Inventors: Russell L. Pond, Euless; James K. Langford, North Richland Hills, both of Tex.

[73] Assignee: Uniden America Corporation, Fort Worth, Tex.

[21] Appl. No.: 744,709

[22] Filed: Oct. 31, 1996

[51] Int. Cl.⁶ ..................................................... G06F 3/00
[52] U.S. Cl. ........................... 345/327; 345/352; 345/334
[58] Field of Search ................................... 345/327, 328, 345/339, 333, 341, 342, 346, 353, 354, 357, 352, 334; 348/7, 10, 12, 13

[56] References Cited

U.S. PATENT DOCUMENTS

| | | |
|---|---|---|
| 5,485,197 | 1/1996 | Hoarty ..................................... 345/353 |
| 5,524,195 | 6/1996 | Clanton, III et al. .................... 345/327 |
| 5,589,892 | 12/1996 | Knee et al. .................................. 348/7 |
| 5,623,613 | 4/1997 | Rowe et al. ............................. 345/353 |
| 5,629,733 | 5/1997 | Youman et al. ............................. 348/7 |

*Primary Examiner*—Raymond J. Bayerl
*Assistant Examiner*—Cao H. Nuyen
*Attorney, Agent, or Firm*—Akin, Gump, Strauss, Hauer & Feld, L.L.P.; Michael Rocco Cannatti

[57] ABSTRACT

A program schedule user interface for use in television applications, such as cable or satellite broadcast programming. The interface allows for display of program scheduled information in full screen or minimized mode and provides additional useful configurations of the program schedule information.

20 Claims, 10 Drawing Sheets

Fig. 6 — CLOSED PAGE MODE

PROGRAM SCHEDULE USER INTERFACE

FIELD OF THE INVENTION

The present invention relates generally to a programming control system used in conjunction with a television system. More specifically, the present invention provides an improved method and apparatus that allows a television viewer to access an on-screen listing of television programs.

BACKGROUND OF THE INVENTION

In recent years there has been a substantial increase in the amount of television programming available to viewers. Moreover, recent advances in microprocessors and computer software have made it possible to make information relating to such television programming available on the television screen in a format similar to that which would be found in a conventional, printed television programming guide. However, such systems use the television monitor to display the schedule information, impeding the viewer's ability to see or preview any program on the screen. In addition, such systems do not efficiently convey schedule-related information in a user-friendly format.

SUMMARY OF THE INVENTION

In accordance with the invention, an interactive television schedule system is provided for displaying channels and for displaying program schedule information in the form of a configurable program screen guide where the screen guide includes at least a channel bar for identifying selectable program channels and for identifying the currently selected channel. The system may also include a user input for providing input control signals. In one of the embodiments of the invention, the interactive television system includes a controller for configuring the program screen guide to include only the channel bar, and for alternately configuring the program screen guide to include the channel bar in combination with a grid of program information identifying a plurality of channels and the programs to be broadcast on the channels.

In accordance with an alternate embodiment of this invention, the interactive television system also includes left and right movement control arrow keys on the user input which are used to highlight information slots in the program information grid and are also used to alternately configure the program screen guide. In yet another embodiment of the present invention, the interactive television schedule system controller is responsive to user input control signals to configure the channel bar, either to identify the selectable program channels by channel name (with the selected channel identified by channel number) or to identify the selectable program channels by channel number (with the selected channel identified by channel name). In another embodiment of the present invention, the interactive television schedule system may configure the program screen guide to include a page bar for identifying the presence of any program channel information (such as selectable program channels or time-dependent program information) that is not shown on the currently displayed program screen guide.

In accordance with another embodiment of the present invention, a television screen display control device is provided for displaying at least one selected channel and for displaying program schedule information in the form of a multiply configurable program screen guide. In accordance with one aspect of this embodiment of the present invention, a display controller is provided for configuring the program screen guide to include only a program bar so that substantially all of the television screen is available for viewing the selected channel on the television screen, and for alternately configuring the program screen guide to include the program bar in combination with the program information grid of two-dimensionally arranged information slots where each row of information slots corresponds to a channel identified in the program bar and each row includes an information slot for at least a current program. In one embodiment of this invention, the television screen display control device includes a user input having left and right movement control arrow keys and the control device is responsive to the arrow keys to highlight an information slot in the program information grid so that an activation of the left movement arrow when an information slot for a current program is highlighted causes the program screen guide to display only the program bar. In accordance with a separate aspect of the present invention, an activation of the right arrow key when the program screen guide includes only the program bar causes the program screen guide to be reconfigured to display the program bar in combination with the program information grid. In accordance with a further embodiment of the present invention, the television screen display control device responds to user input control signals to swap the configuration of the program bar from a configuration where the selectable program channels are identified by channel name to a configuration where the selectable channels are identified by channel number. In a still further embodiment of the present invention, the controller of the television screen display control device permits the program screen guide to be configured to display a page bar for identifying the presence of any selectable program channels that are not presently displayed.

In accordance with the present invention, a method is provided for interfacing with program schedule information, including the steps of displaying a channel on a television screen, displaying a multiply configurable program screen guide (including a channel bar and a program information grid), and minimizing the appearance on the television screen of the screen guide to display only the channel bar so that the selected channel is displayed substantially in its entirety on the television screen. In one embodiment of this invention, the method includes a step of configuring the screen to include a page bar, and in a separate embodiment of the present invention, the method also includes reconfiguring the channel bar from a configuration where each of a plurality of program channels is identified by channel name to a configuration where the plurality of channels are identified by channel number. In an alternate embodiment of the present invention, the program schedule user interface method includes the step of displaying a single channel screen guide for only a particular channel in response to a user input signal where the single channel screen guide comprises a listing of programs to be shown on the particular channel. In accordance with an alternate embodiment of the present invention, the program schedule user interface method includes the step of selecting a first available channel from a range of channels in response to a channel range selection signal wherein unavailable channels are identified and the next available channel after the range of unavailable channels is displayed.

In accordance with the present invention, an interactive television schedule system is provided in which a television display, receiver, and user input are directly or indirectly coupled, whereby the receiver responds to a first user input signal to configure a program screen guide so that it displays a channel bar for identifying a plurality of channels, and the receiver responds to a second user input signal to configure the screen guide to display for a single selected channel a listing of the programs to be shown on that channel. In accordance with one embodiment of the present invention, the interactive system also responds to additional user input control signals to alternately configure the program screen guide to show only the channel bar or to show the channel bar in combination with a program information grid of two-dimensionally arranged information slots, each row of information slots and including an information slot for at least a current program.

DETAILED DESCRIPTION OF THE PREFERRED EMBODIMENT

Figure 1:
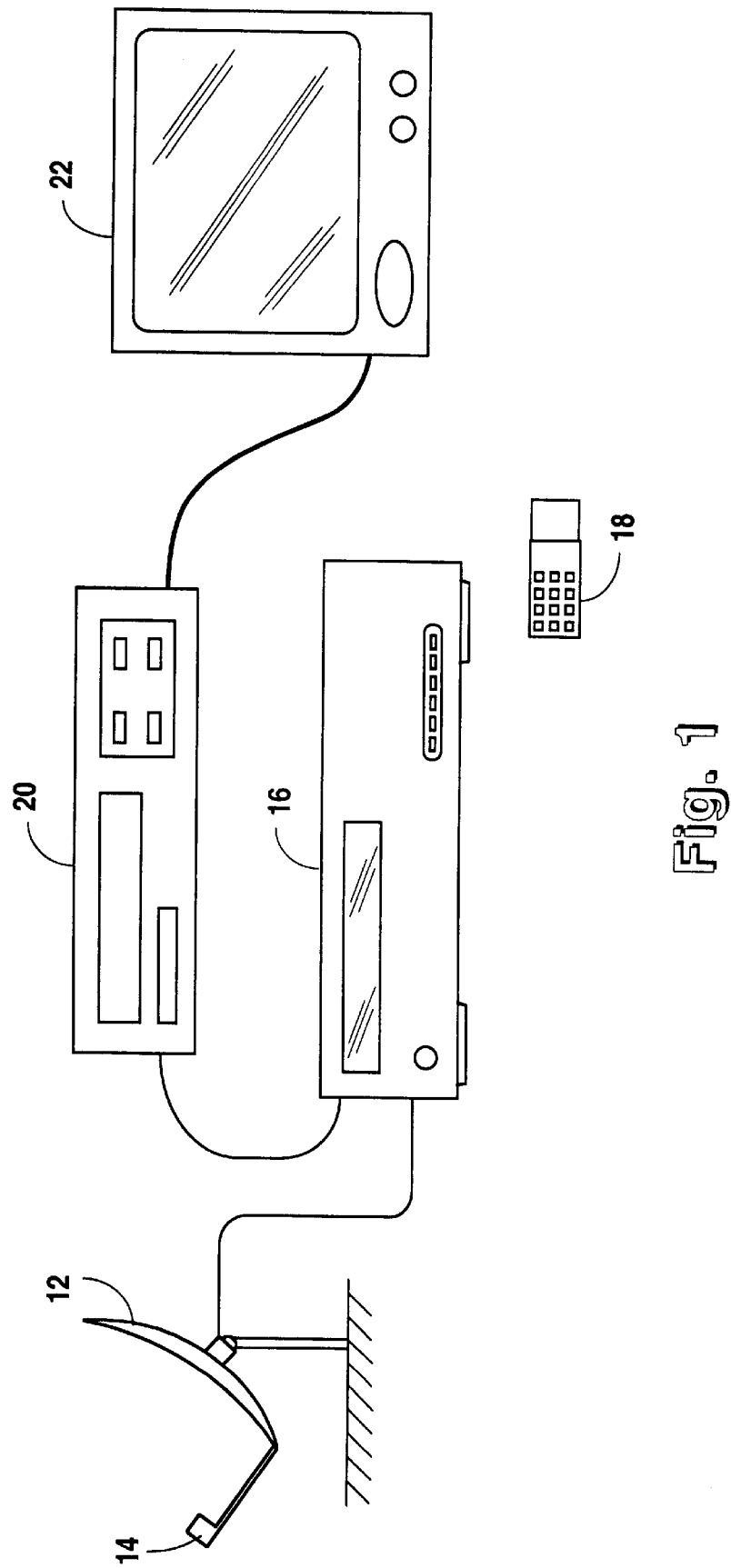
FIG. 1 is a block diagram of a digital satellite system for viewing and recording programs broadcast by a satellite network.

FIG. 1 is a block diagram of a digital satellite system for receiving programs broadcast by a satellite network. The satellite receiving system comprises an antenna 12 in the form of a parabolic reflector dish, a feedhorn and low noise block down converter/amplifier assembly (LNB) 14. The satellite receiving system further comprises an integrated television receiver/descrambler (IRD) 16 with an accompanying remote control unit 18, video cassette recorder 20 and a conventional television receiver/monitor 22. While the system does not require a video recorder for operation, a recorder is illustrated and will be discussed below in connection with some of the features of the invention system. In connection with the general use of program guides, the operation of remote control systems and on-screen program guides is described generally in U.S. Pat. No. 5,479,268, entitled User Interface for Television Schedule System and issued to Young et al. on Dec. 26, 1995, which by this reference is incorporated for all purposes.

Figure 2:
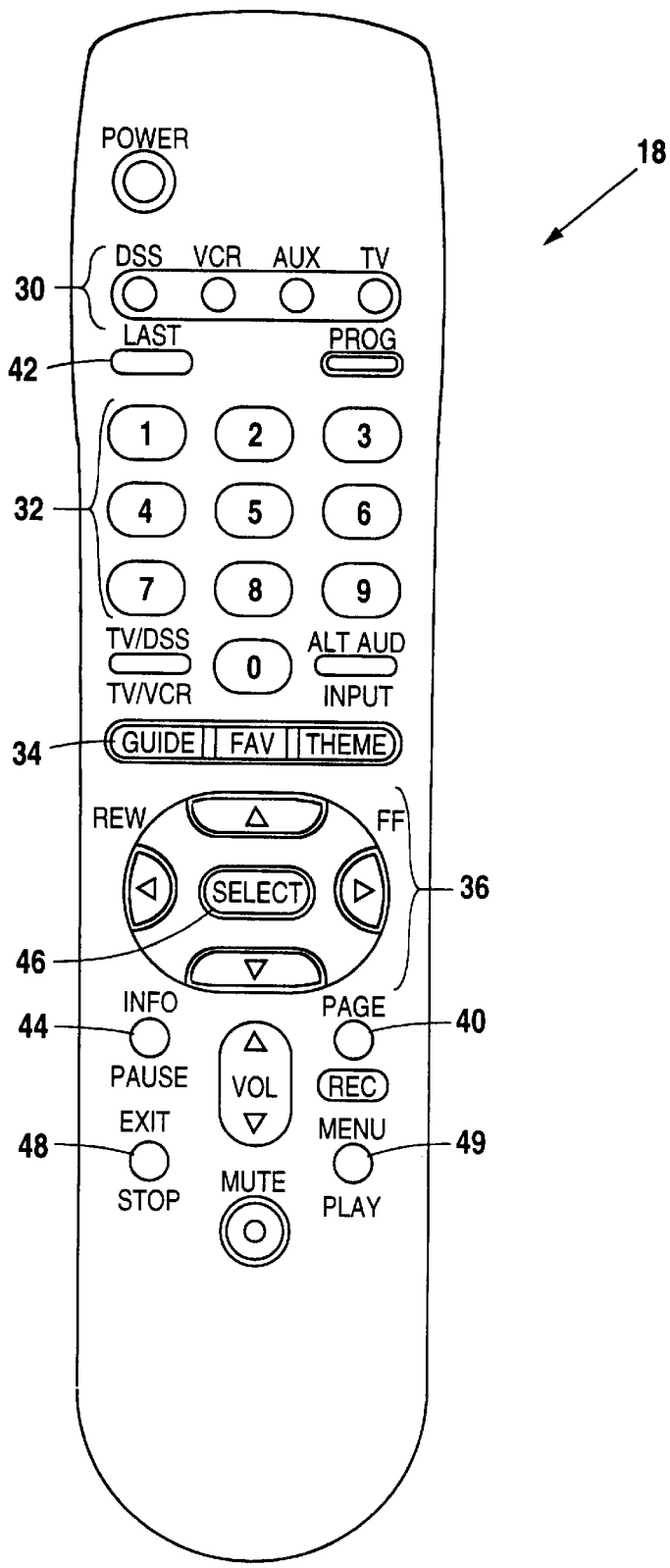
FIG. 2 is an illustration of the remote control unit used in connection with the digital satellite system of the present invention.

FIG. 2 is an illustration of a digital satellite system hand held remote control unit 18 used in a selected embodiment of the present invention. The digital satellite system remote control unit has four different modes of operation: DSS, VCR, AUX and TV in the control block illustrated by reference numeral 30. These various modes of operation allow a single remote control unit to operate a multiplicity of entertainment equipment. In each of the modes, the control unit sends infrared (IR) control signals and/or UHF signals, as described more fully below.

In the discussion herein, it will be assumed that the remote control unit 18 is operating in digital satellite system mode unless otherwise indicated, although the claimed invention is not necessarily so limited. Actual screens for each of the different modes of the on-screen program guide will be shown to illustrate the features of the user interface system. These screens may be displayed on the television monitor 22, but may also be shown on other display screens, such as any display included on the remote control unit 18 (not shown). The term "normal viewing," as used herein, will refer to an operating state of the receiver where no screens are displayed and the "current" channel is tuned.

In digital satellite system mode, the number keys (0–9), illustrated collectively by reference numeral 32, are used to enter channel numbers to tune the IRD 16, but may also be used to enter other information (i.e., favorite programs from a favorites menu may be selected numeric entry). The arrow keys on the oval disk 36 can be used in a variety of ways depending on the specific screen being displayed at any particular time. In the normal viewing mode, the up and down arrow keys are used to change channels and the left and right arrow keys are inactive (although they may be provided with separate functionality). When operating the program guide, however, the four arrow keys are used to move the cursor to a desired program slot within the guide. The specific functions of the various arrow keys for operation of the program guide will be discussed in greater detail below.

When the system is being operated in the normal viewing mode, the on-screen programming guide can be displayed on the TV screen by pressing the GUIDE key 34 on the remote control unit 18. The specific program guide displayed when the GUIDE key 34 is pressed will depend on whether the current "mode" of the system is "open" or "closed." If the user presses the GUIDE key while in normal viewing mode and the previous program guide was in the "Open Mode," then the screen shown in FIG. 5 will appear. Thus, when the system is operating in the "Open Mode," the program guide will be displayed in a "grid" format. For purposes of discussion, it is assumed that the system is initially in the "open" mode and that the initial programming guide displayed will be the "Open Mode" program guide.

Figure 3:
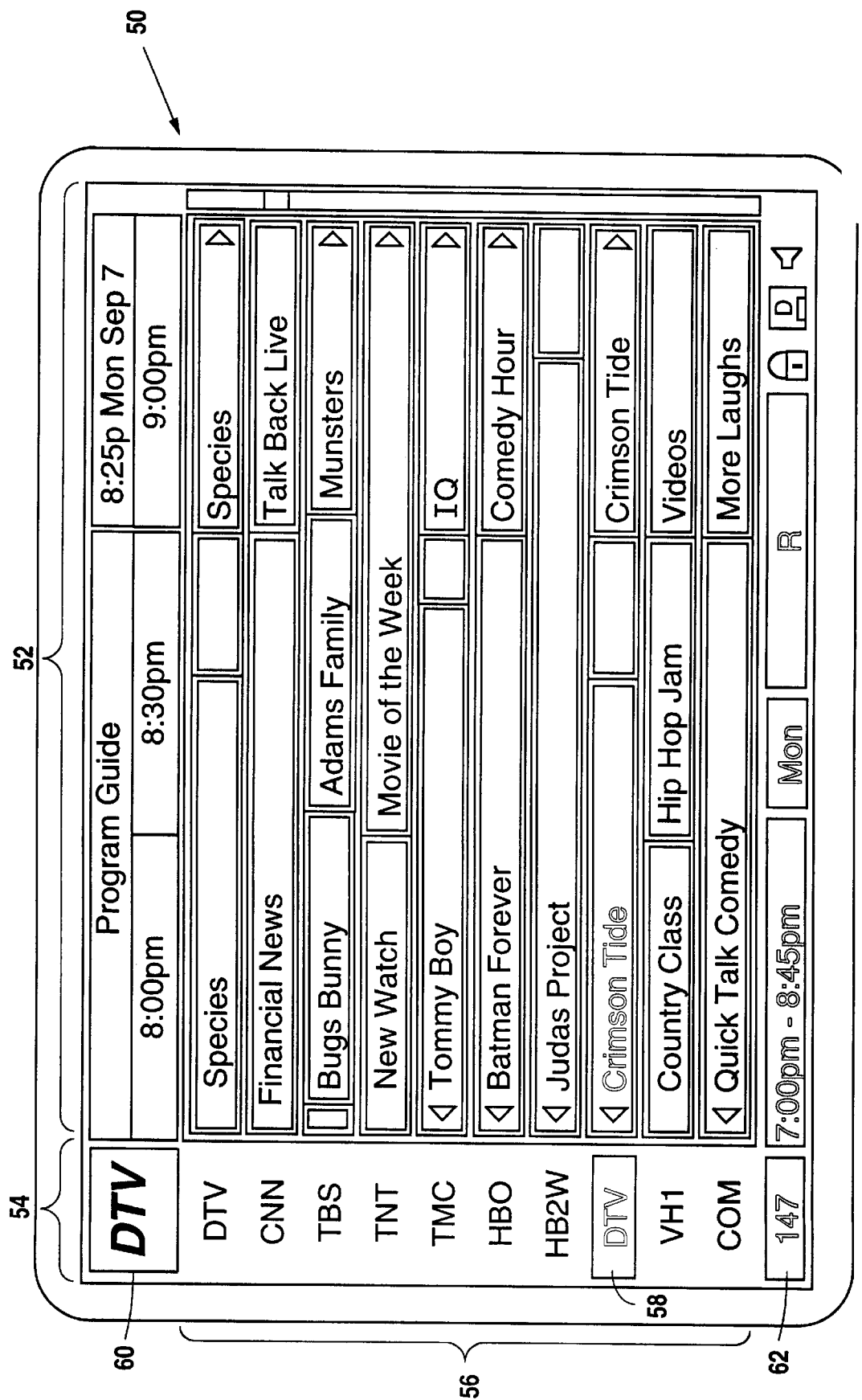
FIG. 3 is an illustration of a program guide screen display operating in the "Open Mode."

FIG. 3 is an illustration of an "Open Mode" program guide screen 50. The screen comprises a grid of program information illustrated by dashed box 52 and a program bar or channel bar illustrated by dashed box 54. The information included in the program information grid 52 can include information relating to the program title, date, time of day, start/stop time of the program, rating of the program, data services available and parental lock setting. The information included in the channel bar 54 includes a block of channel names 56 (e.g., DTV, CNN, HBO, etc.) with the current channel 58 (e.g., DTV) being highlighted. The logo 60 of the current channel is displayed at the top of the channel bar 54 and the number 62 of the current or selected channel is displayed at the bottom. Although the channel bar is shown on the left side of the screen, it is to be understood that the channel bar can be placed on any other border of the screen without departing from the spirit and scope of the invention.

Figure 4:
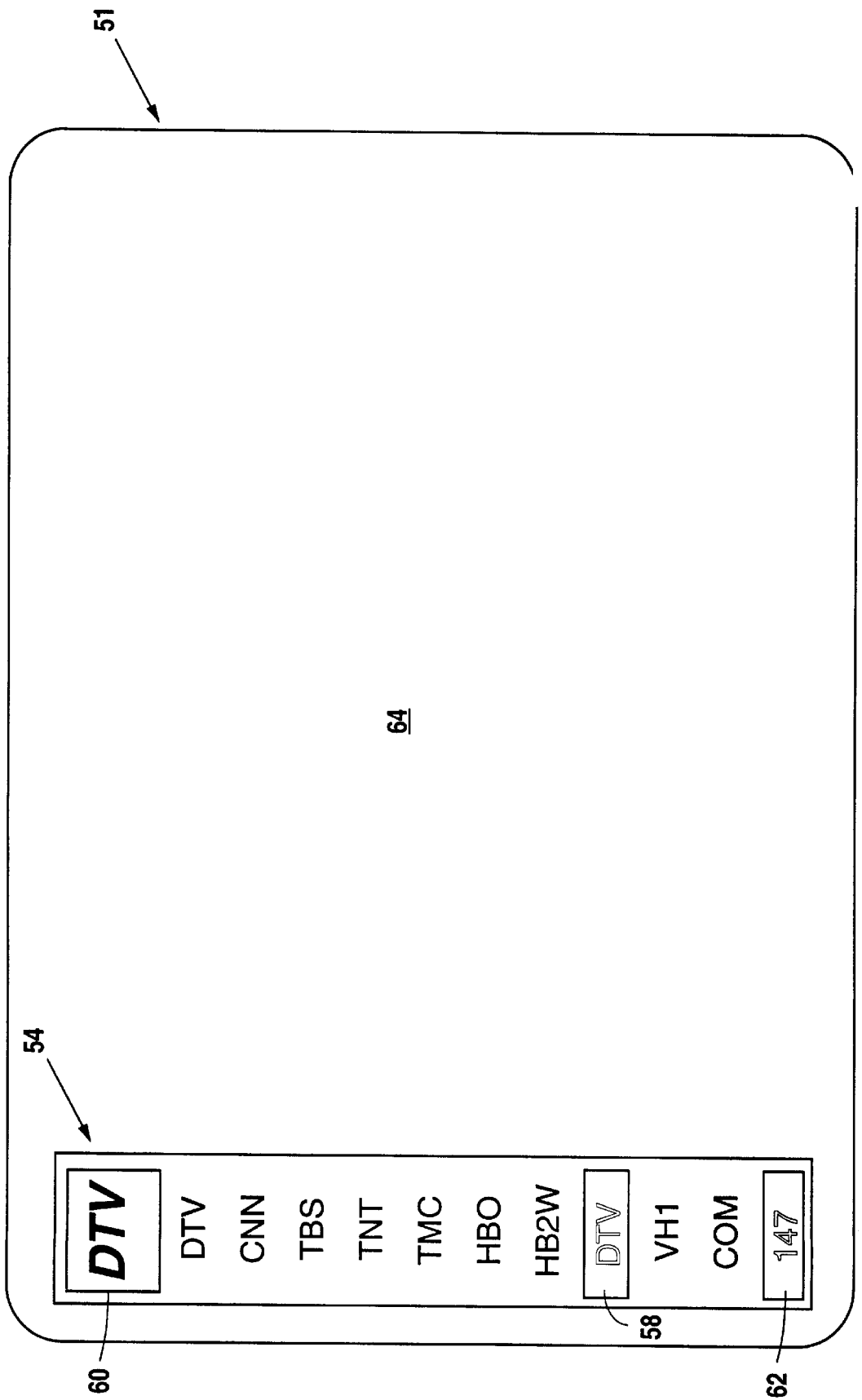
FIG. 4 is an illustration of a program guide screen display operating in the "Closed Mode."

FIG. 4 is an illustration of the "Closed Mode" program guide screen 51. As can be seen, the channel bar 54 is displayed on the left of the screen; however, the remaining portion of the screen, illustrated by reference numeral 64, is available for previewing the selected channel without exiting the program guide. Operating in the "Closed Mode," the user is able to scroll through the available channels while the background tunes to and displays substantially all of the selected channel.

The user is able to switch between the open and closed mode by pressing predetermined buttons on the remote control unit 18. Specifically, if the system is initially operating in the "Open Mode," and any of the programs in the first (leftmost) time slot is highlighted, the system can be switched to the "Closed Mode" by pressing the left arrow on the oval disk 36. If the program guide is in the "Closed Mode," and any channel on the channel bar 54 is highlighted, the system can be switched to the "Open Mode" by pressing the "right" arrow on the oval button 36.

Under another selected embodiment of the present invention, remote control unit 18 includes PAGE key 40 can be used to display a screen that allows the user to "page" forward, backward, up and down through various screens in a "page" mode. According to one aspect of the "page" mode, the up and down arrow keys will display only a selected subset of the available channels (i.e., ten (10) channels at a time) and the program screen guide includes a page bar for identifying the presence of any selectable program channels that are not present on the currently displayed channel bar. According to a separate aspect of the "page" mode when it is used while in the "Open Mode," the left and right arrow keys advance by a predetermined time interval (i.e., one day intervals) the portion of the available program schedule information that is displayed and the program screen guide includes a page bar for identifying the presence of any time-dependent program information for the program channels that is not presently shown on the program screen guide.

When the program guide screen is activated, the user may change channels on the receiver in two ways—by using the up and down arrow keys or by direct channel entry. When the up or down arrow key is pressed, the channels will change sequentially in the order of their listing on the channel bar 54. Pressing the up arrow key once changes to the next available channel in decreasing order, and pressing the down arrow key once changes to the next available channel in increasing order. If either of the up or down arrow key is depressed for a predetermined period of time (for example, one half second), the channels will change more rapidly in either decreasing or increasing order, respectively.

Channels can also be selected by entering the channel numbers directly. For example, to change to channel 221, the user can sequentially press the numerals [2], [2], and [1]. When operating in direct channel entry mode, the receiver changes channels immediately after the third digit has been entered. According to a still further aspect of the present invention, the user interface provides a functionality to accommodate selective availability of channel information in the broadcasting spectrum. In particular, because certain channels or ranges of channels have been reserved from use for future applications, it would be advantageous to automatically avoid the unavailable channels when seeking to tune the receiver. According to an aspect of the present invention, such "smart" channel selection can be accomplished by use of a "wild card" entry in the channel identification provided, with a functionality that interprets such a "wild card" as an instruction to retrieve the first available channel in the indicated range. The availability of the channels can be determined in any of a number of different ways, such as by downloading such information from an appropriate source or by providing a sampling functionality in the system for detecting the suitability of a particular channel for broadcasting activity, but in a preferred embodiment, the system is programmed with information identifying the unavailable channels. For example, if channels 280–285 had been reserved or otherwise unavailable for transmission, the user could identify the selected channel with the numbers "28*" (where the asterisk is the wild card), and the user interface would retrieve the first available channel in the indicated range, namely channel 286. In this way, the present invention provides "smart" channel selection without requiring the user to scroll through, retrieve and tune through a plurality of otherwise unavailable channels.

Figure 5:
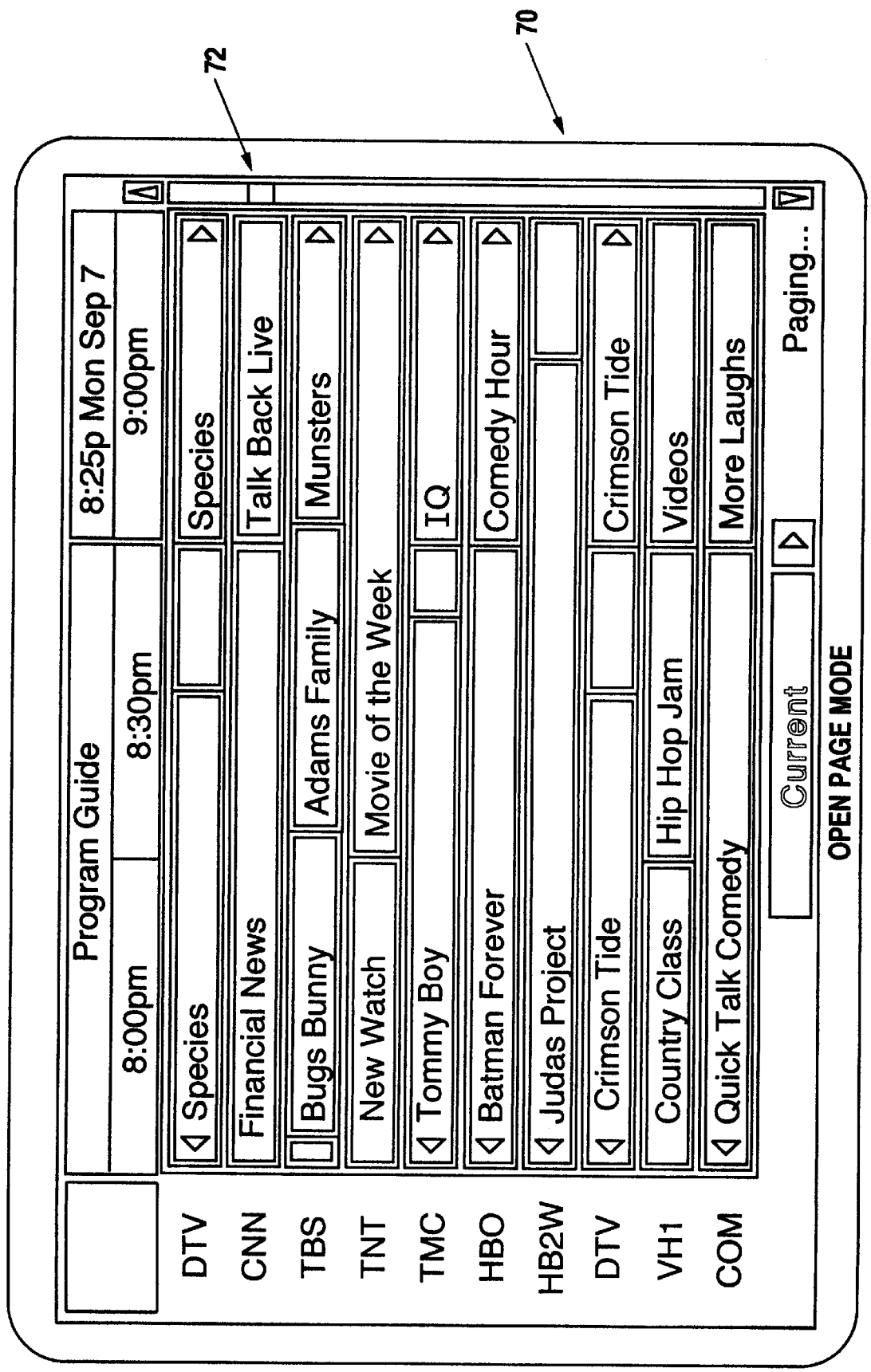
FIG. 5 is an illustration of the program guide of the present invention operating in the "Open Mode" with the "Page" feature operational.
Figure 6:
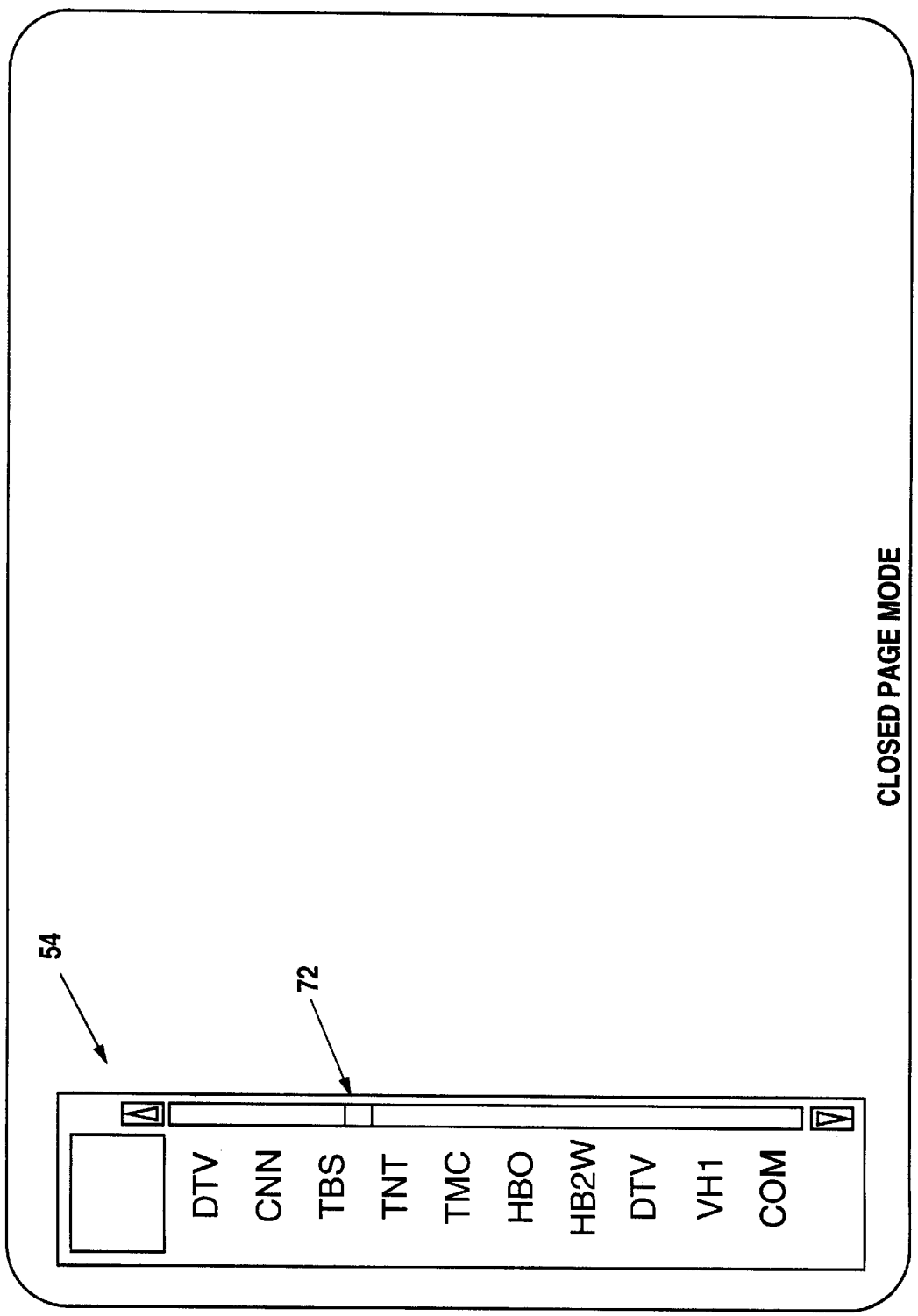
FIG. 6 is an illustration of the program guide of the present invention operating in the "Closed Mode" with the "Page" feature operational.

As shown in FIGS. 5 and 6, the "Page Mode" can be used when the program guide screen 50 is in "Open Mode," and can also be used when the program guide screen 51 is in "Closed Mode." According to one embodiment of the present invention, when the program guide is in "Page Mode," the program guide screen 70 includes a page bar 72 as shown in FIG. 5. According to a separate embodiment of the present invention in which the guide screen is in "Open Mode," the program guide screen 70 includes a page bar 71 for indicating the presence of any program channel information (such as time-dependent program information) that is not shown on the currently displayed program screen guide. As will be appreciated by those skilled in the art, the page bars 71, 72 visually convey to the user information about the position of the currently displayed page relative to the total pages available for viewing. For example, a vertical bar along the side of the program guide screen may include a segment that is highlighted or otherwise visually distinct from the remainder of the bar, and the position of this highlighted portion relative to the remainder of the bar indicates how many additional pages of channel information are available for viewing. Alternatively, the page bar 72 may provide an alphanumeric indication of which page is being viewed (i.e., "page 1 of 6" or "⅙"). As shown in connection with FIG. 6, a page bar 72 can also be used in connection with the "Closed Mode" operation to provide a visual or alphanumeric indication next to the channel bar 54. Thus, one of the advantages of the present invention in providing channel previewing with a minimized program guide screen in the "Closed Mode" is maintained with the use of the "Page Mode" feature disclosed herein.

Figure 7:
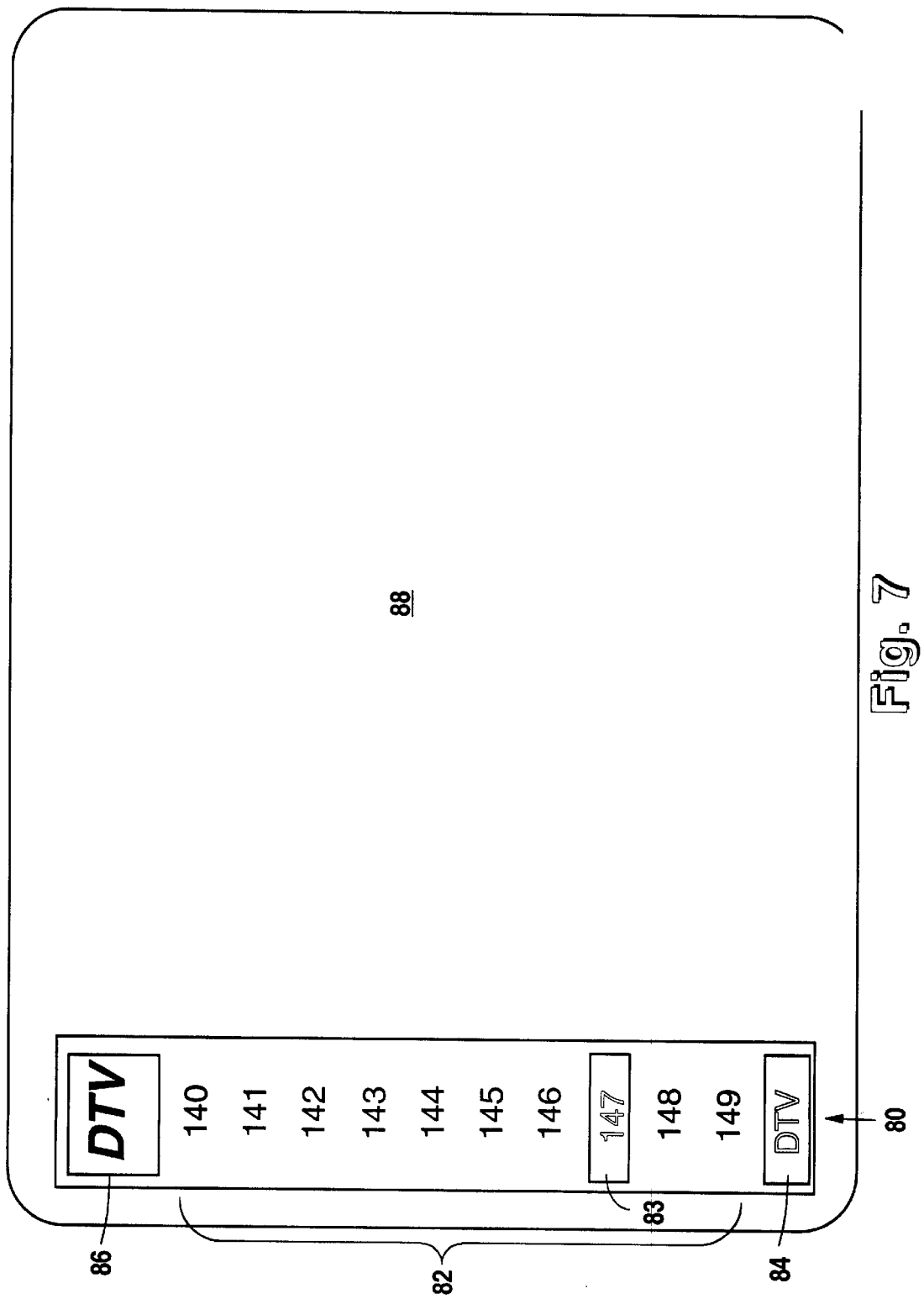
FIG. 7 is an illustration of the program guide of the present invention operating in the "Closed Mode" with the "Swap" feature operational to change the relative positions of the channel names and the channel numbers in the display.

According to another embodiment of the present invention as illustrated in FIG. 7, the information provided in the channel bar portion of the program guide screen can be relabeled according to the user's preference. In particular and as illustrated in connection with the "Closed Mode" shown in FIG. 7, channel bar 80 is displayed on the left of the screen to permit the remaining portion of the screen 88 to be used for previewing the selected channel without exiting the program guide. However, the information included on the channel bar 80 has been relabeled to include a block of channels 82 identified by their respective channel numbers with a current selected channel 83 being highlighted. At the top of the channel bar 80, the logo of the currently selected channel 86 is displayed, and at the bottom of the channel bar 80, the name or title of the selected channel is displayed in the bottom position 84.

In accordance with this aspect of the present invention, if the user desires to review channel numbers rather than the channel names, then a selected key on the remote control unit can be activated to relabel the information on the channel bar. By way of example and not limitation to the present invention, the remote control unit 18 can include a LAST key which, when activated, causes the channel labels displayed in the channel bar of the program guide screen to be swapped or toggled to identify channels by their channel numbers instead of by channel names.

As will be appreciated by those skilled in the art, the functionality of the present invention as described above can be implemented with a combination of hardware and software, and the specific components of the present invention can be allocated in different ways among the component elements described above without parting from the spirit or breadth of the present invention. In particular, any microprocessor or microcontroller implementation of the present invention can be accomplished equally well, whether the microprocessor circuitry is physically located inside the remote control unit 18, inside the integrated receiver/descrambler 16, inside the television 22 or in any of the other components depicted in FIG. 1. Likewise, any required memory storage hardware can be physically located with the microprocessor circuitry or separately from the microprocessor circuitry. In addition, any software programs or other data used to implement the present invention can be stored in a single physical location (such as the remote control unit 18), or can be dispersed among the component elements of any television display system.

Figure 8:
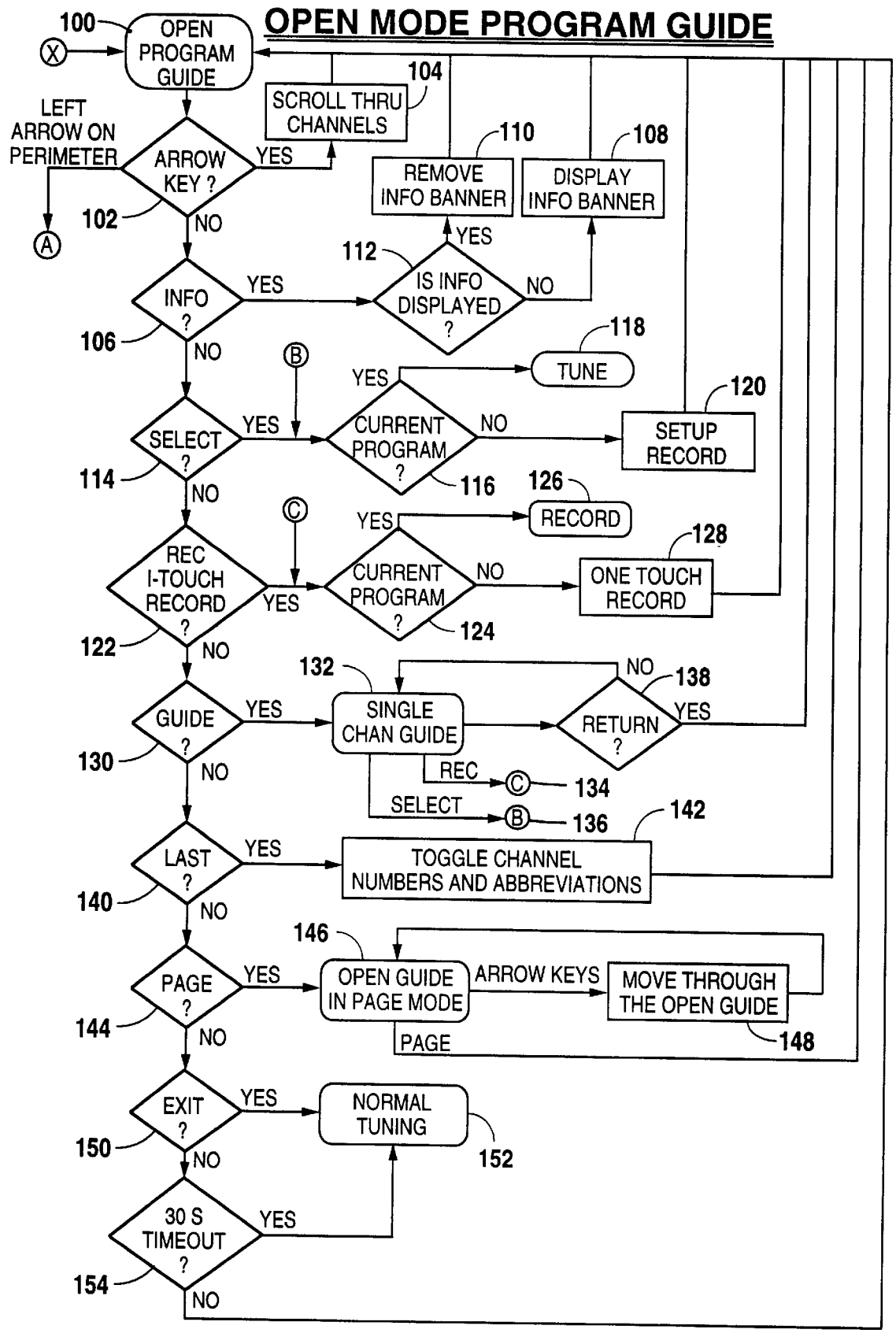
FIG. 8 is a flow chart illustration of the operation of the program guide software when operating in the "Open Mode."

FIG. 8 illustrates the operation of a selected embodiment of the present invention in flowchart form in connection with the "open mode" program guide as implemented on the remote control unit 18 depicted in FIG. 2. As will be appreciated by those skilled in the art, the flowchart operation depicted in FIG. 8 includes not only selected embodiments of the present invention, but also includes features in addition to the present invention.

When the user wishes to view the full text of the program guide screen, the user can cause the screen to display the grid of program information along with channel bar at step 100 by, for example, actuating the GUIDE key 34 of the remote control unit 18. Once in the "Open Mode," the present invention is implemented with a series of decisional queries, the specific sequencing or combination of which is not critical to the present invention. For example, the determination of whether the INFO key 44 has been actuated could be made prior to the determination of whether any of the arrow keys in the oval disk 36 had been activated.

When the user interface is in "Open Mode," a determination is first made at decision block 102 whether one of the arrow keys from the oval disk 36 has been actuated. Under one embodiment of the present invention, if the leftmost time slot program (i.e., a current program) is highlighted and the left arrow key is activated, the user interface enters into the "Closed Mode" as described in greater detail below in connection with FIG. 9. Any other activation of an arrow key will cause the highlight bar to scroll through the program information grid 52 as indicated at step 104.

If no arrow key is activated, a determination is next made at step 106 of whether the INFO key 44 has been activated. If the INFO key 44 has been activated, the appropriate preselected information (such as channel number or program description information) is removed at step 110 or displayed at step 108, depending upon whether the information was already displayed or not, respectively, as determined by decision block 112. If the INFO key is not activated, the user interface proceeds to the next decisional inquiry.

Upon determination that the SELECT key 46 has been activated at step 114, the user interface determines whether a current program has been selected at step 116. For example, an activation of the SELECT key 46 when the program guide screen shown in FIG. 3 was displayed would cause the receiver to tune to the DTV channel at step 118 to display the "Crimson Tide" program which is the current program as indicated by the highlighting of this entry. If, however, the "Comedy Hour" program on HBO was highlighted in the program guide screen when the SELECT key was pressed, the user interface would realize at step 116 that a current program had not been selected, and would then enter the setup record step 120 to obtain information about when the selected program should be recorded. If the SELECT button 46 was not activated at step 114, the user interface would proceed to the next decisional block.

If the REC button 40 had been activated to implement the one-touch record feature at step 122, the user interface determines whether the program highlighted on the program information grid 52 is a current program at decisional block 124, in which case the user interface causes the program to be recorded at step 126 by, for example, turning on the VCR 20 and activating the record function. If, however, the program highlighted in the program information grid 52 is not a current program when the REC key was pressed, the user interface retrieves the appropriate information about the selected program (such as the time, length and channel of the selected program) and subsequently causes that program to be recorded at step 128. If the REC button 40 is not activated at step 122, the user interface proceeds to the next decisional step.

If the user interface determines that the GUIDE key 34 of the remote control unit 18 has been activated at decisional step 130, the user interface enters into a single channel guide mode whereby the program guide screen is reformatted to display only the program information for the particular selected channel at step 132. The information presented in the single channel guide mode can be organized into a number of rows with each row showing the time, date, and program title in the chronological order for the programs on that particular channel. As shown in FIG. 8, the user interface can enter into the record mode at the step 134 or the select mode at step 136. As will be appreciated by those skilled in the art, the record mode operates substantially as set forth in connection with the steps associated with decisional block 122, and the select mode operates substantially in accordance with the steps associated with decisional block 114. The user interface will otherwise remain in the single channel guide mode until returned to the "Open Mode" by, for example, activation of the "0" key as detected at step 138. Alternatively, pressing the "GUIDE" key 34 a second time will cause the system to return to normal viewing. Thus, the sequence of screens resulting from pressing the "GUIDE" key three times in succession from when the television is in normal viewing mode is Normal Viewing→Program Guide TV→Single Channel Guide→Normal Viewing. If there is no detection of the GUIDE key at decision block 130, the user interface proceeds to the next decisional block.

If the user interface detects the activation of the LAST key 42 on the remote control unit 18 at decisional block 140, the user interface causes the channel identification information contained in the channel bar to be toggled or swapped from its current status. For example, if the channel bar 54 is configured to identify the plurality of channels by their respective channel names and the bottommost position of the channel bar identifies only the channel number of the selected channel, an activation of the LAST key 42 will cause the channel bar to be reconfigured to identify the plurality of channels by their respective channel numbers and to use the bottommost position of the channel bar to identify only the name of the selected channel. Once the channel bar format has been reconfigured in step 142, the user interface reverts to the "Open Mode" of the user interface at step 100.

If the activation of the PAGE key 40 on the remote control unit 18 is detected at decisional block 144, the user interface enters into the "Page Mode" whereby the program guide screen is modified to include a visual indication of the page mode such as a vertical page bar along the rightmost side of the program guide screen. Once the user interface is in the "Page Mode" at step 146, the arrow keys of the oval disk 36 can be used to move through the program information grid at step 148, or if the PAGE key 40 is activated again, the user interface leaves the "Page Mode" and returns to the "Open Mode" at step 100. If there is no detection of the PAGE key activation at step 144, the user interface proceeds to the next decisional step.

In situations where the keyboard layout of the remote control unit 18 assigns more than one functionality to a particular key (such as assigning both the REC and PAGE functions to a single key), those skilled in the art will appreciate that there are many ways to provide multi-functionality to a particular key. As but one illustrative example of a preferred embodiment of the present invention, the controller is programmed to implement the PAGE functionality (adding or removing the page bar to the screen guide) if the key is activated for less than a predetermined time period, and is programmed to implement the REC functionality (initiating the record function) if the key is activated for more than a predetermined time period, such as three seconds.

The user interface may proceed to an exit sequence to determine whether the EXIT button 48 has been activated at step 150, in which case the user interface reverts to the normal viewing mode without any program guide screen displayed on the monitor (as shown at step 152), or in the alternative, a timeout program is implemented at step 154 to revert to the normal viewing mode unless there is some detectable activity on the program guide screen, in which case the user interface reverts to the "Open Mode" at step 100.

Figure 9:
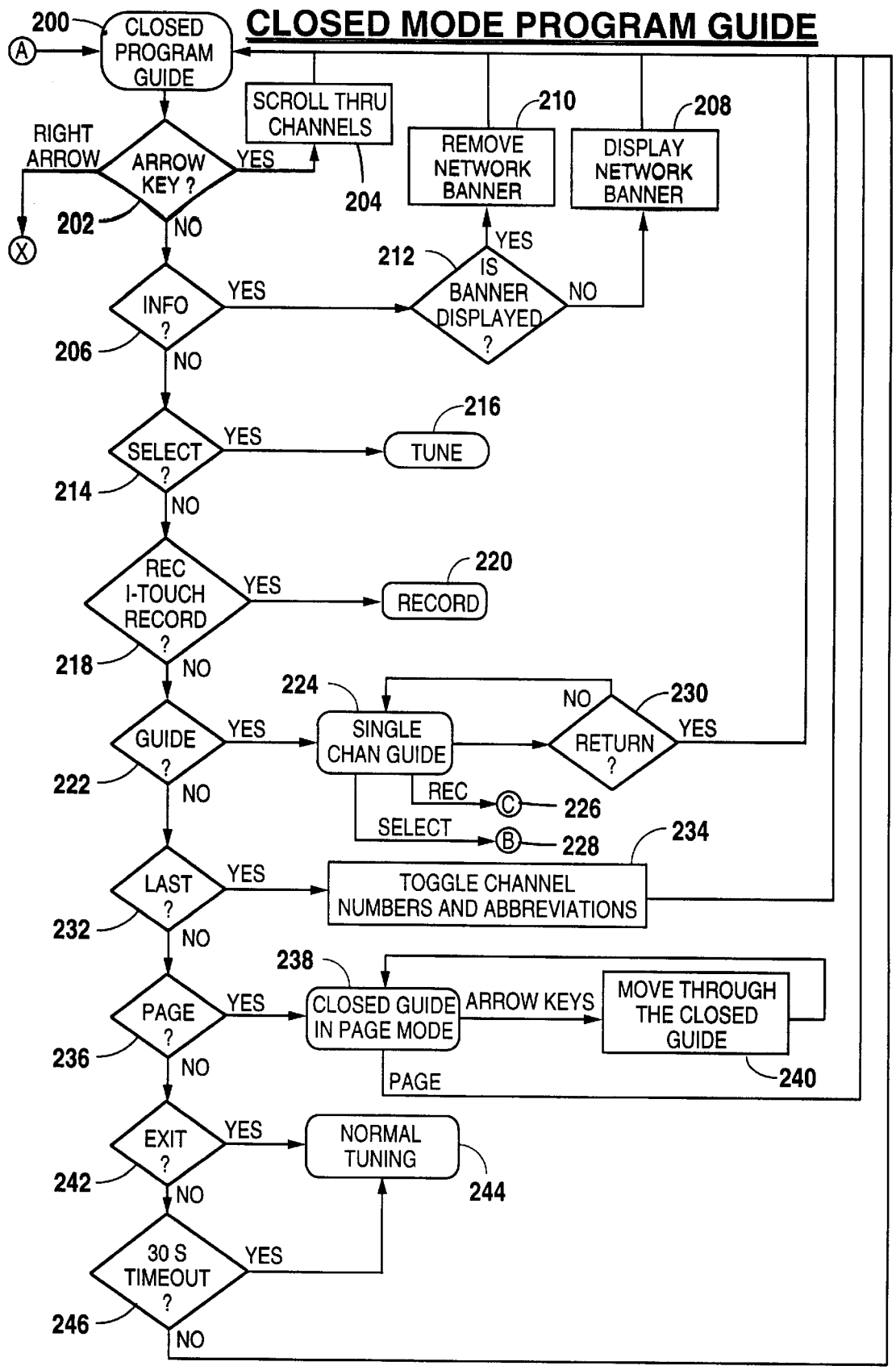
FIG. 9 is a flow chart illustration of the operation of the program guide software when operating in the "Closed Mode."

FIG. 9 illustrates the operation of a selected embodiment of the present invention in flowchart form in connection with the "Closed Mode" program guide as implemented on the remote control unit 18 depicted in FIG. 2. As will be appreciated by those skilled in the art, the flowchart operation depicted in FIG. 9 includes not only selected embodiments of the present invention, but also includes features in addition to the present invention.

When the user wishes to preview a selected channel without closing the program guide screen, or for any other reason wishes to minimize the program guide screen, the user can cause the screen to display only the channel bar portion of the program guide screen, which is referred to as the "Closed Mode." The "Closed Mode" can be entered at step 200 by, for example, activating the left arrow key when any of the programs in the first or leftmost time slot is highlighted, such as is shown in FIG. 3. As explained above in connection with the "Open Mode," the present invention as implemented in the "Closed Mode" consists of a series of decisional queries, the specific sequencing or combination of which is not critical to the present invention, and thus the flowchart of FIG. 9 illustrates one selected embodiment of the invention.

When the user interface is in the "Closed Mode," a determination is first made in decision block 202 whether one of the arrow keys from the oval disk 36 has been actuated. Under one embodiment of the present invention, an activation of the right arrow key will cause the user interface to enter into the "Open Mode" as described in connection with step 100 shown in FIG. 8. If instead, the up or down arrows are actuated, the user interface causes the highlight to scroll up and down the listing of channels depicted on the channel bar, which in turn causes a corresponding change to the information displayed in the uppermost position (reserved for channel logo information) and the bottommost position (reserved for alternate channel identification information). In addition, the scrolling of the highlight may also cause the tuner to change the selected channel displayed on the monitor to correspond to the channel highlighted on the channel bar. If no activation of an arrow key is detected at decisional block 202, the user interface proceeds to the next decisional block.

If the INFO key 44 is activated at decisional block 206, the appropriate preselected information (such as channel number or program description) is removed at step 210 or displayed at step 208, depending upon whether the information was already displayed or not, respectively, as determined by the decision block 212. If the INFO key is not activated, the user interface proceeds to the next decisional inquiry.

Upon determination that the SELECT key 46 has been activated at step 214, the user interface causes the receiver to be tuned to the selected channel at step 216. At this point, the program guide screen can be maintained on the display or can be removed by activation of the EXIT button 46 or by means of a timeout function. If the SELECT button was not activated, the user interface proceeds to the next decisional block.

If the REC button 40 of the remote control unit 18 has been activated to implement the one-touch record feature at step 218, the user interface causes the selected channel to be recorded at step 220. If the REC button 40 is not activated at step 218, the user interface proceeds to the next decisional step.

If the user interface determines that the GUIDE key 34 of the remote control unit 18 has been activated at decisional step 222, the user interface enters into the single channel mode described above in connection with steps 130, 132, 134, 136 and 138 depicted in FIG. 8, the only difference being that an activation of the "0" key returns the system to the "Closed Mode." If there is no detection of the GUIDE key actuation at decision block 222, the user interface proceeds to the next decisional block.

If the user interface detects the activation of the LAST key 42 on the remote control unit 18 at decisional block 232, the user interface causes the channel identification information contained in the channel bar to be toggled or swapped as described above in connection with FIG. 8. If there is no detection of the LAST key being activated at decisional block 232, the user interface proceeds to the next decisional block.

If the activation of the PAGE key 40 on the remote control unit 18 is detected at decisional block 236, the user interface enters into the "Page Mode" whereby the minimized program screen guide is modified to include a visual indication of the page mode, for instance, a vertical page bar along the rightmost side of the minimized program guide screen. Once the user interface is in the "Page Mode" at step 238, the up and down arrow keys of the oval disk 36 can be used to move through the channel bar at step 240, or if the PAGE key is activated again, the user interface leaves the "Page Mode" and returns to the "Closed Mode" at step 200. If there is no detection of the PAGE key activation at step 236, the user interface proceeds to the next decisional step.

The user interface may proceed to an exit sequence substantially as described in connection with FIG. 8.

Figure 10:
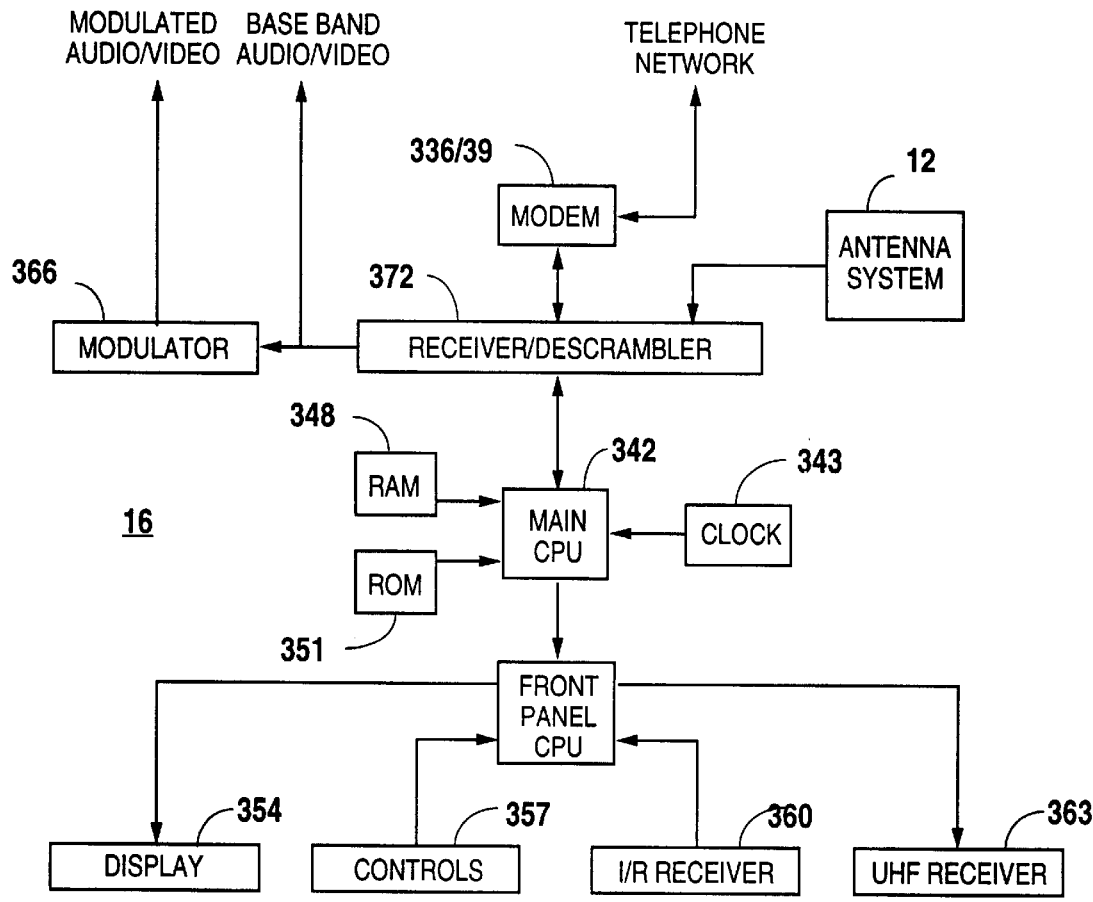
FIG. 10 is an electrical block diagram of the integrated receiver/descrambler, modem and antenna system.

FIG. 10 is an electrical block diagram of the IRD 16 along with the antenna system 12 in a preferred embodiment of the present invention. As shown in FIG. 10, the IRD comprises a main microprocessor (main CPU) 342 and a front panel microprocessor (front panel CPU) 345 which communicate through a microprocessor bus. The front panel CPU 345 acts as a slave to the main CPU 342 and serves to control the front panel display 354, operator controls 357, infrared received (I/R receiver) 360 and UHF receiver 363.

The main CPU 342 controls the overall operation of the IRD 16 by executing object code software stored in the read only memory (ROM) 351 and by both writing and reading data to and from the random access memory (RAM) 348. Communications between the various peripheral devices and the main CPU 342 is accomplished with a conventional microprocessor bus.

The present invention can be implemented in connection with a movable antenna system (in which case a CPU actuator drive unit would control the position of the antenna system 12), but in a preferred embodiment of the present invention, the antenna system 12 is a fixed eighteen inch offset antenna in which the low noise block down converter/amplifier assembly 14 is positioned off center so that the reflected signals are not blocked by the LNB assembly and so that there is no need for any actuator drive unit.

Reference is now directed to both FIG. 1 and FIG. 10. The broadcast satellite signal is initially received by the antenna system 12 and coupled to the IRD 16 via a cable assembly. The receiver/descrambler 372 receives the broadcast satellite signal and selectively tunes a single channel as controlled by the main CPU 342. The receiver/descrambler 372 is of conventional design and well known in the art. Receiver/descrambler 372 frequency selection for transponder tuning and other parameters are controlled by the main CPU 342.

The receiver/descrambler 372 is coupled to the main CPU to enable control thereof. In addition, the receiver/descrambler 372 is coupled to either an external modem 336 or an internal modem 339. The modem enables communication between the receiver/descrambler 372 and the service provider's central control point by communicating through the operator's voice telephone line into the public telephone network. The output of the receiver/descrambler 372 is a base band signal suitable for direct connection to a video monitor or video cassette recorder. The receiver/descrambler 372 output is further coupled to an RF modulator 366 that modulates the base band signal onto an RF carrier, thus enabling connection of the modulator 366 modulated audio/video output to a conventional television or a conventional videotape recorder. The main CPU 342 is further coupled to a clock 343 which provides a timing signal to the CPU 342.

Figure 11:
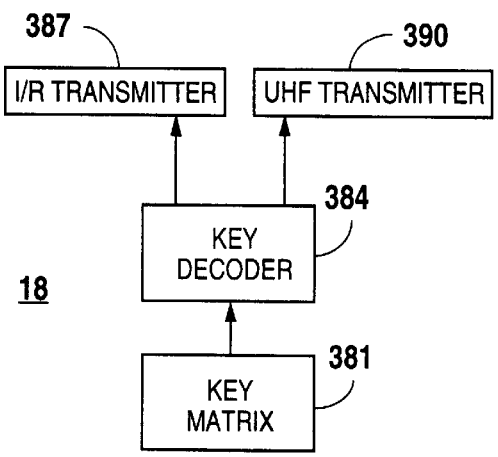
FIG. 11 is an electrical block diagram of the remote control unit for the integrated receiver/descrambler.

Reference is now directed toward FIG. 11 which is an electrical block diagram of a wireless remote control unit 18 for remotely controlling the IRD in a preferred embodiment of the present invention. The wireless remote control unit 18 comprises a key matrix 381 coupled to a key decoder 384 which is in turn coupled to an infrared transmitter 387 and a UHF transmitter 390 for remote communication with the IRD 16. Both infrared and UHF communication modes are employed to provide reliable remote operation in both line of sight and obstructed remote locations. As the operator depresses keys in the key matrix 381, the key decoder 384 converts the information to a data stream. The data stream is transmitted via infrared light and UHF radio wave signals to the IRD 16.

While the satellite broadcast receiving system of the present invention has been described in connection with the preferred embodiment, it is not intended to limit the invention to the particular form set forth, but on the contrary, it is intended to cover such alternatives, modifications, and equivalents as may be included within the spirit and scope of the invention as defined by the appended claims.

We claim:

1. An interactive television schedule system, comprising:
   a display for displaying at least one selected channel,
   a controller coupled to the display for displaying program schedule information in the form of a multiply configurable program screen guide and for configuring the multiply configurable program screen guide, said multiply configurable program screen guide comprising a channel bar for identifying a plurality of selectable program channels with an alphanumeric identification for each of said channels and for identifying a currently selected channel, and
   a user input coupled to the controller for providing user input control signals,
   said controller being responsive to a first user input control signal to configure the multiply configurable program screen guide to include only the channel bar, and being responsive to a second user input control signal to configure the multiply configurable program screen guide to include the channel bar in combination with a program information grid of two-dimensionally arranged information slots, each row of information slots corresponding to a channel identified in the channel bar and including an information slot for at least a current program.

2. The interactive television schedule system of claim 1 in which the user input comprises left and right movement control arrow keys and the controller is responsive to the movement control arrow keys to highlight an information slot in the program information grid, wherein the first user input control signal comprises an activation of the left movement control arrow key when an information slot for a current program is highlighted.

3. The interactive television schedule system of claim 2 wherein the second user input control signal comprises an activation of the right movement control arrow key when the multiply configurable program screen guide is configured to display only the channel bar.

4. The interactive television schedule system of claim 1 in which the controller is responsive to a third user input control signal to configure the channel bar to identify each of the plurality of selectable program channels by channel name and identify the currently selected channel by channel number, and is responsive to a fourth user input control signal to configure the channel bar to identify each of the plurality of selectable program channels by channel number and identify the currently selected channel by channel name.

5. The interactive television schedule system of claim 1 in which the controller is responsive to a page mode control signal from the user input to configure the multiply configurable program screen guide to further include a page bar for identifying the presence of any program channel information that is not present on the currently displayed multiply configurable program screen guide.

6. A television screen display control device for displaying on a television screen at least one selected channel and for displaying program schedule information, said control device comprising:

a display controller for displaying program schedule information in the form of a multiply configurable program screen guide and for configuring the multiply configurable program screen guide, said multiply configurable program screen guide comprising a program bar for identifying a plurality of selectable program channels with an alphanumeric identification for each of said channels, said display controller being responsive to a first user control signal to configure the multiply configurable program screen guide to include only the program bar so that substantially all of the television screen is available for viewing the selected channel on the television screen, and being responsive to a second user input control signal to configure the multiply configurable program screen guide to include the program bar in combination with a program information grid of two-dimensionally arranged information slots, each row of information slots corresponding to a channel identified in the program bar and including an information slot for at least a current program.

7. The television screen display control device of claim 6 further comprising a user input coupled to the control device in which the user input comprises left and right movement control arrow keys and the control device is responsive to the movement control arrow keys to highlight an information slot in the program information grid, wherein the first user input control signal comprises an activation of the left movement control arrow key when an information slot for a current program is highlighted.

8. The television screen display control device of claim 7 wherein the second user input control signal comprises an activation of the right movement control arrow key when the multiply configurable program screen guide is configured to display only the program bar.

9. The television screen display control device of claim 6 in which the control device is responsive to a third user input control signal to configure the program bar to identify each of the plurality of selectable program channels by channel name and identify the currently selected channel by channel number, and is responsive to a fourth user input control signal to configure the program bar to identify each of the plurality of selectable program channels by channel number and identify the currently selected channel by channel name.

10. The television screen display control device of claim 6 in which the control device is responsive to a page mode control signal to configure the multiply configurable program screen guide to further include a page bar for identifying the presence of any selectable program channels that are not present on the currently displayed program bar.

11. A method for providing a program schedule user interface on a television screen comprising the steps of:

displaying a selected channel on the television screen;

displaying a multiply configurable program schedule information screen guide comprising
a channel bar for identifying a plurality of selectable program channels including the selected channel to be displayed on the television screen with an alphanumeric identification for each of said channels, and
a program information grid of two-dimensionally arranged information slots, each row of information slots corresponding to a channel identified in the channel bar and including an information slot for at least a current program; and minimizing the appearance on the television screen of the multiply configurable program schedule information screen guide in response to a first user input control signal to display only the channel bar so that the selected channel is displayed substantially in its entirety on the television screen to permit user previewing of the selected channel.

12. The method of claim 11 further comprising the step of configuring the multiply configurable program schedule information screen guide to include a page bar for identifying the presence of any selectable program channels that are not present on the currently displayed channel bar.

13. The method of claim 12 wherein the channel bar of the multiply configurable program schedule information screen guide is configured to identify each of the plurality of selectable program channels by channel name and identify the currently selected channel by channel number, said method further comprising the step of:

reconfiguring the channel bar in response to a user input control signal to identify each of the plurality of selectable program channels by channel number and identify the currently selected channel by channel name.

14. The method of claim 11 further comprising the step of displaying a single channel screen guide for the selected channel in response to a single channel guide input signal, said single channel screen guide comprising a listing of programs to be shown on the selected channel.

15. The method of claim 11 further comprising the step of selecting a first available channel from a range of channels in response to a channel range selection signal input which specifies the range of channels, said selecting step comprising identifying which channel in the range of channels is not available for broadcasting and displaying the next available channel in the range of channels.

16. An interactive television schedule system, comprising:

a television display, a receiver coupled to the television display for displaying program schedule information in the form of a configurable program screen guide, and a user input coupled to the receiver for providing user input control signals and for identifying a selected channel, said receiver being responsive to a first user input control signal to configure the configurable program screen guide to comprise a channel bar for identifying a plurality of selectable program channels by channel name and identifying the currently selected channel by channel number, and being responsive to a second user input control signal to configure the channel bar to identify the plurality of selectable program channels by channel number and identify the currently selected channel by channel name.

17. The interactive television schedule system of claim 16 wherein:

the receiver is responsive to a third user input control signal to configure the configurable program screen guide to include only the channel bar, and is responsive to a fourth user input control signal to configure the configurable program screen guide to include the channel bar in combination with a program information grid of two-dimensionally arranged information slots, each row of information slots corresponding to a channel identified in the channel bar and including an information slot for at least a current program;

the user input comprises left and right movement control arrow keys; and the receiver is responsive to the movement control arrow keys to highlight an information slot in the program information grid, wherein the third user input control signal comprises an activation of the left movement control arrow key when an information slot for a current program is highlighted.

18. The interactive television schedule system of claim 17 wherein the fourth user input control signal comprises an activation of the right movement control arrow key when the configurable program screen guide is configured to display only the channel bar.

19. The interactive television schedule system of claim 16 in which the receiver is responsive to a fifth user input control signal to configure the configurable program screen guide to comprise a single channel screen guide comprising a listing of programs to be shown on the selected channel.

20. The interactive television schedule system of claim 16 in which the receiver is responsive to a page mode control signal from the user input to configure the configurable program screen guide to further include a page bar for identifying the presence of any selectable program channels that are not present on the currently displayed channel bar.

* * * * *